United States Patent [19]
Wilson et al.

[11] Patent Number: 5,646,606
[45] Date of Patent: Jul. 8, 1997

[54] TRANSMISSION OF TRANSMITTER PARAMETERS IN A DIGITAL COMMUNICATION SYSTEM

[76] Inventors: Alan L. Wilson, 3720 Alder Dr., Hoffman Estates, Ill. 60195; David L. Muri, 2355 NW. 110 Ter., Sunrise, Fla. 33322; James M. O'Connor, 6248 Glenview Dr. Apt. 250, North Richland Hills, Tex. 76180; Jeffrey W. Klingberg, 3709 Greenstone Dr., Ft. Worth, Tex. 76137

[21] Appl. No.: 41,132

[22] Filed: Mar. 30, 1993

Related U.S. Application Data

[63] Continuation of Ser. No. 707,523, May 30, 1991, abandoned.

[51] Int. Cl.$^6$ ................................................ G08B 5/22
[52] U.S. Cl. .......................... 340/825.37; 340/825.36
[58] Field of Search .................. 340/825.37, 825.36, 340/825.44, 825.72; 455/39.3, 69, 70, 88, 116, 126, 127, 342; 380/48, 49

[56] References Cited

U.S. PATENT DOCUMENTS

| | | | |
|---|---|---|---|
| 3,795,896 | 3/1974 | Isaacs | 340/825.36 |
| 4,517,561 | 5/1985 | Burke et al. | 340/825.07 |
| 4,577,315 | 3/1986 | Otsuka | 455/38.3 |
| 4,692,945 | 9/1987 | Zdunek | 455/17 |
| 4,701,944 | 10/1987 | Howard et al. | 379/63 |
| 4,716,407 | 12/1987 | Borras et al. | 455/166.2 |
| 4,723,264 | 2/1988 | Sasuta et al. | 379/58 |
| 4,757,536 | 7/1988 | Szczutkowski et al. | 380/48 |
| 4,817,157 | 3/1989 | Gerson | 381/40 |
| 4,825,193 | 4/1989 | Siwiak et al. | 340/311.1 |
| 4,905,234 | 2/1990 | Childress et al. | 370/94.1 |
| 4,972,439 | 11/1990 | Kuznicki et al. | 340/825.44 |
| 5,003,619 | 3/1991 | Morris et al. | 455/69 |

*Primary Examiner*—John K. Peng
*Assistant Examiner*—Andrew Hill
*Attorney, Agent, or Firm*—Susan L. Lukasik

[57] ABSTRACT

In a system for transmitting digital information, transmitter operating parameters (503) are transmitted with other communication message information (501, 505, 507, 509, 511, 513, 515, and 517) to aid communications.

13 Claims, 2 Drawing Sheets

TRANSMISSION OF TRANSMITTER PARAMETERS IN A DIGITAL COMMUNICATION SYSTEM

This is a continuation of application Ser. No. 07/707,523, filed May 30, 1991 and now abandoned.

FIELD OF THE INVENTION

This invention relates to two-way digital communication systems, including but not limited to signalling methods and apparatus.

BACKGROUND OF THE INVENTION

Radios generally function to receive broadcast signals. Usually, the user of a radio will not be personally interested in all of the signals that are broadcast on a communication resource (such as a particular frequency or a particular TDM time slot). For example, many broadcast signals include an identifying signal to facilitate proper processing in certain radios. Other broadcast signals include special identifying signals, such as tone signals or subaudible digital signals, that the radio can recognize and respond to.

Dispatch communication systems are known. In such a system, a user will typically not himself enter a specific code to identify a specific user. Instead, the user's communication unit has predetermined talk groups programmed into it to automatically provide the system with the appropriate information to allow establishment of a dispatch call. Therefore, the user often simply keys the microphone and begins talking without the need for any dialing or manual user selection mechanisms at all. The intended listener, being a member of the defined talk group (and all other members of the same talk group), will generally receive this voice communication, and the communication path establishment and maintenance protocol is substantially transparent to the users.

Many signals of interest, such as a talk group call, are prefaced with a specific identifying preamble, such as an ID (identification) for the transmitting radio. Preambles may be lengthy and are always at the risk of truncation, especially in systems employing scanning techniques or when multipath distortion or fading occur. Many systems cannot properly place a radio call without the preamble, resulting in lost transmissions. Clearly, this is not a desirable state for a communications system, especially when calls are urgent in nature.

Some systems with emergency capability rely on repetitive transmissions of short signals, such as a tone. The transmissions are spaced in time to enable an acknowledgment to be received by the transmitting radio. Typically, these transmissions contain no indication of the nature of the emergency. Some systems follow up acknowledgment of the emergency transmissions by remotely keying up the radio for a limited time, say 10 seconds, to monitor the situation. These remote key-ups may be delayed by several seconds, which could easily be critical seconds in an emergency.

Furthermore, it is essential that an emergency transmission be received by the dispatcher with a minimum of distortion or error in the transmission. Often, users turn down the transmit power output of a portable radio to conserve battery power. This practice may cause a transmission to be distorted sufficiently to render the emergency message useless in handling the situation.

Accordingly, a communication protocol which provides required system functions, including emergency operation, that are transparent to the user while minimizing loss of transmissions is required.

DESCRIPTION OF A PREFERRED EMBODIMENT

Figure 1:
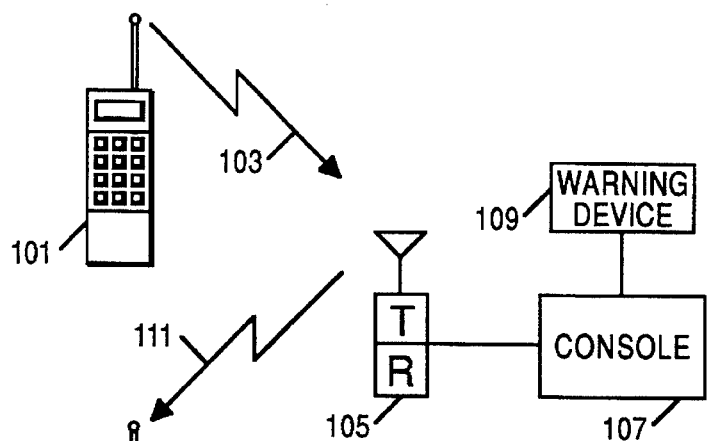
FIG. 1 is a block diagram of a digital communication system in accordance with the invention.

The following describes a communication protocol which provides required system functions, including emergency call operation, that are transparent to the user while minimizing a loss of transmissions. Specially formatted data is transmitted repeatedly throughout the message, along with user voice/data information. If the beginning of the message is not picked up by a receiver, the remaining part of the message contains the necessary information to properly decode the message.

The following description in conjunction with the drawings describes a method of transmitting, by a transmitter, transmitter operating parameter information in a communication message, comprising the steps of transmitting message information and transmitting, repeatedly, but not continuously, interleaved with said message information, additional information regarding at least one transmitter operating parameter of the transmitter. The at least one transmitter operating parameter may comprise an emergency indication and/or transmitter power of the transmitter. When the at least one transmitter operating parameter comprises said emergency indication, said emergency indication may be first included after a portion of said message information is transmitted without said emergency indication.

The following also describes a transmitter for transmitting transmitter operating parameter information in a communication message, comprising means for transmitting message information and means for transmitting, repeatedly, but not continuously, interleaved with said message information, additional information regarding at least one transmitter operating parameter of the transmitter. The at least one transmitter operating parameter may comprise an emergency indication and/or transmitter power of the transmitter. When the at least one transmitter operating parameter comprises said emergency indication, said emergency indication may be first included after a portion of said message information is transmitted without said emergency indication.

The following also describes a system for transmitting emergency communication messages with a transmitter, comprising means for transmitting message information; means for transmitting, repeatedly, but not continuously, interleaved with said message information, additional information regarding at least one transmitter operating parameter of the transmitter; means for receiving said transmitted additional information; and means, responsive to said means for receiving, for activating a warning device when said at least one transmitter operating parameter is an indication of an emergency communication. The at least one transmitter operating parameter may comprise transmitter power of the transmitter.

The following also describes a method of transmitting, by a transmitter, transmitter operating parameter information in a communication message, comprising the steps of: generating message information; generating link control data, which includes additional information regarding at least one transmitter operating parameter of the transmitter, which link control data is segregated into pieces that are repeatedly, but not continuously, interleaved with said message information, forming the communication message; and transmitting the communication message. The at least one transmitter operating parameter may comprise an emergency indication and/or transmitter power of the transmitter. When the at least one transmitter operating parameter comprises said emergency indication, said emergency indication may be first included after a portion of said message information is transmitted without said emergency indication.

In this system, information is relayed between communication units or between a communication unit and a base station or repeater. As shown in FIG. 1, communication unit 101, such as a portable digital radio, transmits a message on a communication channel 103 to a base station 105. This transmission is received and decoded by the base station 105. Depending on the information in the transmission, the communication may be transferred, via wireline or other such media, to a console 107 (where a dispatch operator monitors incoming calls) or may be repeated on another RF channel 111 to another communication unit 113 in the system.

In many systems, it is occasionally necessary to transmit an emergency indication. To accommodate such a signal, this system includes, connected to the console 107, a warning device 109 that is activated when an emergency call/communication is received (more emergency call information appears later). This warning device may be a siren, a warning light, a visual message on a computer, or any other similar device or combination thereof. A user initiates an emergency call by pressing an emergency button on the communication unit 101. When the emergency call from the unit 101 is received by the base station 105, the call is automatically transferred to the console as well as to the intended destination (group or individual). The warning device 109 at the console 107 is activated to notify the dispatcher that an emergency exists. The user states his emergency situation as if on a normal call. The dispatcher then alerts any needed services, such as the fire department or police. The dispatcher then transmits a message to the unit 101 to cancel the emergency state of the unit. Optionally, the user may also cancel the emergency state if the emergency button is held down for a certain period of time.

Figure 2:
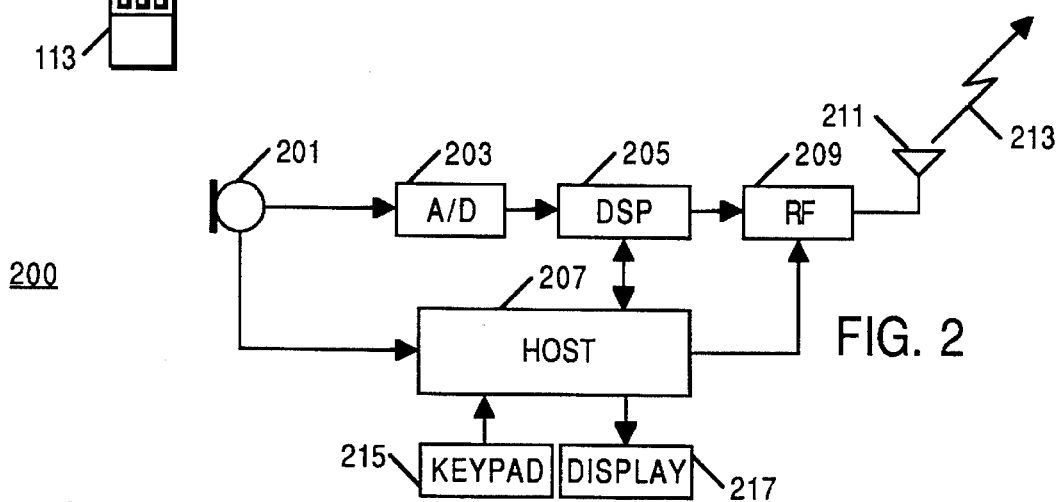
FIG. 2 is a block diagram of a communication unit transmitter in accordance with the invention.

The communication units 101 and 113 typically include both a transmitter and a receiver. A transmitter constructed in accordance with the invention appears in FIG. 2 as generally represented by the reference numeral 200. This radio transmitter 200 includes generally a microphone 201 for receiving an audible voice message to be transmitted, and for providing a push-to-talk (PTT) signal to a host computer 207, such as an MC68HC11 microprocessor, available from Motorola, Inc., the latter being in accordance with well understood prior art technique. The transduced output of the microphone 201 comprises an analog signal representing the voice input, and passes through an appropriate analog to digital converter 203, which digitizes this information and provides the digital representation to a digital signal processor (DSP) 205, such as a DSP56000 available from Motorola, Inc. The DSP 205 is programmed as desired to effectuate a particular voice encoding methodology, such as CELP or VSELP. In this particular embodiment, it will be presumed that the encoding methodology of choice is VSELP. (For further information regarding VSELP encoding, the interested reader is referred to U.S. Pat. No. 4,817,157 entitled "Digital Speech Coder Having Improved Vector Excitation Source," the latter being incorporated herein by this reference.)

The DSP 205 produces as its output a plurality of discrete packets, wherein each packet represents information representing a portion of the original speech information. These packets are provided to an appropriate radio frequency (RF) unit 209, which uses the packet information to modulate an appropriate carrier signal, which carrier signal 213 is then radiated from an appropriate radiating element 211, all as known in the art.

Both the DSP 205 and the RF unit 209 are controlled, at least in part, by the host computer 207. In particular, so configured, the host computer 207 can detect conclusion of a voice message by detecting appropriate manipulation of the PTT switch on the microphone 201. In response thereto, the host computer 207 signals the RF unit 209 to terminate transmission activity. A keypad 215 incorporating multiple keys and/or buttons, including an emergency button, allows user entry of various parameters, such as call type, to the host 207. A display 217 presents operating menus and other parameters from the host 207 to the user.

Figure 3:
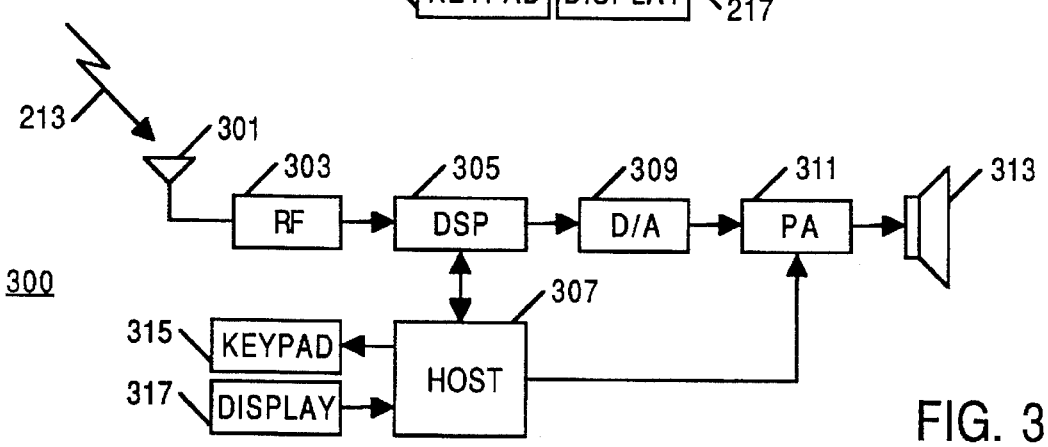
FIG. 3 is a block diagram of a communication unit receiver in accordance with the invention.

Referring now to FIG. 3, the receiver 300 portion of the communication unit includes an antenna 301 for receiving the carrier signal 213 and an associated RF unit 303 for receiving this signal and demodulating it to retrieve the discrete packets as sourced by the transmitter 101. These recovered packets are provided to a DSP 305 that has been appropriately programmed to reconstruct the original voice information based upon the voice packet information. As will be described in more detail, these packets have interleaved therewith signalling information pertinent to various system overhead functions and features. The DSP 305 provides the latter information to a host computer 307.

The output of the DSP 305 comprises a digitized representation of the original voice message. This output passes through an appropriate digital to analog converter 309 and then to a power amplifier 311. The latter amplifies the reconstructed analog voice information, and a speaker 313 then renders this information audible.

The host computer 307, upon receiving a recovered disconnect signal from the DSP 305, will respond by squelching the power amplifier 311, the latter in accordance with prior art technique. A keypad 315 incorporating multiple keys and/or buttons, including the emergency button, allows user entry of various parameters, such as call type, to the host 307. A display 317 presents operating menus and other parameters from the host 307 to the user.

Figure 4:
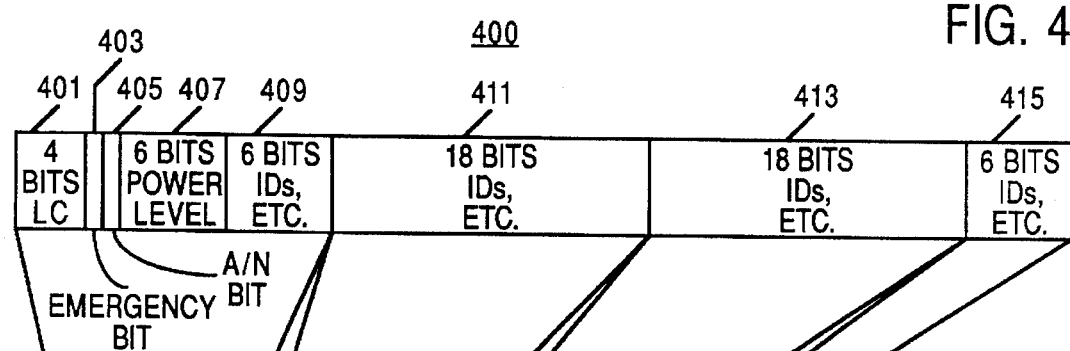
FIG. 4 is a bit field representation of a link control data in accordance with the invention.

As noted above, the voice packet information has interleaved therewith other signalling information. This other signalling information includes link control data that supports selective calls and talk group calls. For a selective call, one individual calls another individual. For a talk group call, voice communications are established between groups of units. When the user places a call, the unit generates 60 bits that define the link control data 400, as shown in FIG. 4. A first field 401 contains a 4-bit link control format, which is binary 0000 for a talk group call and 0011 for a selective call, in the preferred embodiment. Following the link control format is an emergency indication bit 403. When this bit 403 is binary 0, the call is routine. When the emergency bit 403 is binary 1, the call is designated as an emergency call. After the emergency bit 403 is generated, an A/N bit (Acknowledge/Negative acknowledge) 405 is provided to indicate positive connection on the communication link. The A/N bit 405 is binary 0 for an originating message and binary 1 to acknowledge the previous message. Acknowledgments to talk group calls are not expected in this embodiment.

The next field is a 6-bit power level field 407, which indicates the amount of transmit power being used by the originating unit. The value is quantized to the nearest dBm and covers the power range from 0 dBm to +63 dBm. Where P is the transmit power in watts, the power level, L, is defined as L=Round ($10 \log_{10}(P) + 30$). The power level field 407 allows the receiving device to better adapt to the characteristics of the transmission. For example, the value of the 6-bit field 407 may be used as a code between the unit 101 and base 105. The base 105 may see that the unit 101 is transmitting at a power level below its maximum capability. If the base 105 receives a message from the unit 101 with a significant number of errors, the base 105 could then transmit a message back to that unit to increase its power level. This could be important to the user, especially if he needs to transmit an emergency message. His unit 101 will then be able to respond in a more reliable manner. Alternatively, a system may be set up such that a transmitter uses one type of error correction for certain transmit power levels and another type of error correction for other power levels. The base 105 or other receiver uses the power level information 407 to determine how to decode the message. The value of the 6-bit field may be used to do a rapid, convenient field-check of the radio's effective radiated power. To do this check, the radio would be placed in a location whose path loss to the base is known (a particular parking spot, for example). The base would then measure the path loss to the radio. If the value differs from the known path loss, the base signals a problem with the antenna system or power amplifier of the radio. Additionally, the 6-bit field could also be used, in conjunction with the received signal power measured at the base, to construct a path-loss profile for an area where service is being planned, to help plan the location of base site antennas for optimum area coverage.

The remaining fields 409, 411, 413, and 415 contain various control information to maintain the link. These bits may include a talk group ID field, an ID of the transmitting unit, and/or an ID for the intended receiver of the message. Optionally, these IDs may be decoded to reveal a name at the destination unit for visual display, to identify the originator of an emergency call, or to transmit supervisory information to a unit for future reference.

In the preferred embodiment, the link control data is 60 bits in length. These 60 bits are not transmitted in continuous serial order, however. These 60 bits are separated into ten 6-bit groupings which are encoded with a Reed-Solomon code to add ten parity 6-bit groupings, for a total of 120 bits. Each pair of 6-bit groupings is then encoded with a (24,12) extended Golay code, yielding 240 bits, comprised of 10 groups of 24 bits. Reed-Solomon and extended Golay codes are known in the art.

Figure 5:
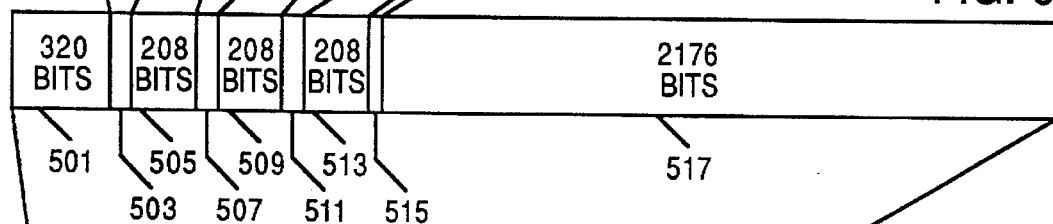
FIG. 5 is a bit field representation of a data frame with link control information in accordance with the invention.

In the preferred embodiment, these 240 bits are transmitted once in every 3360-bit data frame 500. The remaining 3120 bits in the data frame will be referred to as control/data bits, and they include voice data, synchronization data, other control data as appropriate to a particular application, and necessary error encoding data. In the preferred embodiment, the encoded link control data is interleaved throughout the data frame 500, as shown in FIG. 5. The link control data from the first five fields 401, 403, 405, 407 and 409 is encoded into 72 bits and placed in the field 503 that is transmitted after the first 320 control/data bits 501. The next field 411 is encoded into 72 bits 507 and is transmitted after the next 208 control/data bits 505. The next field 413 is also encoded into 72 bits 511 and is transmitted after the next 208 control/data bits 509. The last field 415 is encoded into 24 bits 515 and is transmitted after the next 208 control/data bits 513. The last 2176 control/data bits in the data frame are then transmitted.

Figure 6:
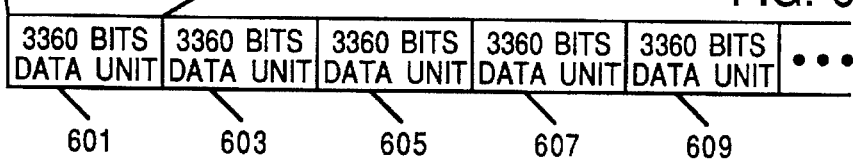
FIG. 6 is a bit field representation of a message format in accordance with the invention.

The link control data is repeated throughout the transmission to ensure that the data reaches the destination, even if some part of the message is truncated before reaching the receiver. As shown in FIG. 6, each message is comprised of a plurality of data frames 601, 603, 605, 607, 609, and so forth. A data frame is transmitted every 360 ms. In the case of an emergency call, this is especially important. The dispatcher will be informed of the emergency situation even if the first part of the message is lost because the information is repeated throughout the message. If any part of the message is lost, the link control data is delayed no more than 360 ms worst case, or about ⅓ of a second. Further, if a user is in the middle of a transmission and an emergency arises, the emergency indication may be initiated during that transmission.

Interleaving an emergency indication with power level data helps reliability of the reception of a transmitted message, especially an emergency message.

What is claimed is:

1. A method of transmitting, by a transmitter, transmitter operating parameter information in a communication message, comprising the steps of:

transmitting message information; and transmitting, repeatedly, but not continuously, interleaved with said message information, additional information regarding at least one transmitter operating parameter of the transmitter, wherein said at least one transmitter operating parameter comprises transmitter power of the transmitter.

2. The method of claim 1, wherein said at least one transmitter operating parameter comprises an emergency indication and transmitter power of the transmitter.

3. A method of transmitting, by a transmitter, transmitter operating parameter information in a communication message, comprising the steps of:

transmitting message information; and transmitting, repeatedly, but not continuously, interleaved with said message information, additional information regarding at least one transmitter operating parameter of the transmitter, wherein said at least one transmitter operating parameter comprises an emergency indication.

4. The method of claim 3, wherein said emergency indication is first included after a portion of said message information is transmitted without said emergency indication.

5. A system for transmitting emergency communication messages with a transmitter, comprising:

means for transmitting message information;

means for transmitting, repeatedly but not continuously, interleaved with said message information, additional information regarding at least one transmitter operating parameter of the transmitter;

means for receiving said transmitted additional information; and means, responsive to said means for receiving for activating a warning device when said at least one transmitter operating parameter is an indication of an emergency communication, wherein said at least one transmitter operating parameter comprises transmitter power of the transmitter.

6. A transmitter for transmitting transmitter operating parameter information in a communication message, comprising:

means for transmitting message information; and means for transmitting, repeatedly, but not continuously, interleaved with said message information, additional information regarding at least one transmitter operating parameter of the transmitter, wherein said at least one transmitter operating parameter comprises transmitter power of the transmitter.

7. The transmitter of claim 6, wherein said at least one transmitter operating parameter comprises an emergency indication and transmitter power of the transmitter.

8. A transmitter for transmitting transmitter operating parameter information in a communication message, comprising:

means for transmitting message information; and means for transmitting, repeatedly, but not continuously, interleaved with said message information, additional information regarding at least one transmitter operating parameter of the transmitter, wherein said at least one transmitter operating parameter comprises an emergency indication.

9. The transmitter of claim 8, wherein said emergency indication is first included after a portion of said message information is transmitted without said emergency indication.

10. A method of transmitting, by a transmitter, transmitter operating parameter information in a communication message, comprising the steps of:

generating message information;

generating link control data, which includes additional information regarding at least one transmitter operating parameter of the transmitter, which link control data is segregated into pieces that are repeatedly, but not continuously, interleaved with said message information, forming the communication message; and transmitting the communication message, wherein said at least one transmitter operating parameter comprises transmitter power of the transmitter.

11. The method of claim 10, wherein said at least one transmitter operating parameter comprises an emergency indication and transmitter power of the transmitter.

12. A method of transmitting, by a transmitter, transmitter operating parameter information in a communication message, comprising the steps of:

generating message information;

generating link control data, which includes additional information regarding at least one transmitter operating parameter of the transmitter, which link control data is segregated into pieces that are repeatedly, but not continuously, interleaved with said message information, forming the communication message; and transmitting the communication message, wherein said at least one transmitter operating parameter comprises an emergency indication.

13. The method of claim 12, wherein said emergency indication is first included after a portion of said message information is transmitted without said emergency indication.

* * * * *